United States Patent

[11] 3,629,610

[72] Inventor Wilhelm Wilhelm
Munich, Germany
[21] Appl. No. 17,731
[22] Filed Mar. 9, 1970
[45] Patented Dec. 21, 1971
[73] Assignee Siemens Aktiengesellschaft
Berlin and Munich, Germany
[32] Priority Apr. 14, 1969
[33] Germany
[31] P 19 18 873.9

[54] ECL LOGIC CIRCUIT
3 Claims, 4 Drawing Figs.

[52] U.S. Cl. .......... 307/218, 330/30 D, 307/215
[51] Int. Cl. .......... H03k 19/22
[50] Field of Search .......... 307/215, 218, 299 A; 330/30 D

[56] References Cited
UNITED STATES PATENTS

| | | | |
|---|---|---|---|
| 3,351,782 | 11/1967 | Narud et al. .......... | 307/218 X |
| 3,229,119 | 1/1966 | Bohn et al. .......... | 307/218 X |
| 3,378,695 | 4/1966 | Marette .......... | 307/218 X |
| 3,394,268 | 7/1968 | Murphy .......... | 307/215 |

*Primary Examiner*—Donald D. Forrer
*Assistant Examiner*—John Zazworsky
*Attorney*—Hill, Sherman, Meroni, Gross & Simpson

ABSTRACT: An emitter-coupled logic circuit for realization of an AND linkage in positive logic, utilizing a differential amplifier in the form of emitter-coupled transistors, in which a polyemitter transistor forms the control input for the differential amplifier and has the emitter electrodes thereof connected over respective emitter-follower stages to the respective input signal sources.

INVENTOR
WILHELM WILHELM

BY Hill, Sherman, Meroni, Gross & Simpson
ATTORNEYS

INVENTOR
WILHELM WILHELM

BY Hill, Sherman, Meroni, Gross & Simpson
ATTORNEYS

ECL LOGIC CIRCUIT

BACKGROUND OF THE INVENTION

The invention is directed to an emitter-coupled logic (ECL) circuit for the derivation of an AND linkage on the basis of positive logic. As herein used, the term "positive logic " is intended to refer to the allocation of the logical "one " to the more positive value, and the logical "zero " to the more negative value of the two binary input or output potential values. The so-called ECL circuits are particularly suited for use in the fabrication of high-speed logical circuits as a result of their low gate transit time. Their basic circuit comprises a differential amplifier having two transistors, the emitters of which are connected together and fed in common with an approximately constant current. The base of the one transistor forms the control input while the base of the other transistor is disposed on a fixed auxiliary potential which is equal at least approximately to the arithmetic mean of the high and the low control potential.

In the formation of OR or NOR functions, there is connected in parallel with the collector-emitter path of the control transistor of NPN-conduction type the collector-emitter path of additional transistors of the same conduction type cf. printed item MECL II Integrated Circuits, of Motorola Semiconductor Products, Inc., sheet 0–3, FIG. 9). As is well known, it is also possible with such gate circuits to carry out AND linkages, if inverted signals are applied to the input. In many cases, however, it is also desirable to be able to carry out AND linkage with ECL circuits, employing uninverted signals. In particular, such a linkage circuit would enable simplifications in the structure of complex logic circuits. In this connection, it might be initially conceived of achieving the desired AND linkage with the retention of the positive logic, by replacement of the NPN-transistors of the known gate circuit with PNP-transistors. However, an AND-gate thus formed could not be directly connected with a known ECL OR gate as the signal potentials corresponding to one another in their logical signification would have different values.

It is therefore the problem of the invention to produce a gate circuit in ECL technique for providing the desired AND linkages which can therefore be circuited directly with known ECL OR gates without the interposition of adaptation members, and which is easily integrable.

SUMMARY OF THE INVENTION

The problem of the invention is solved by a circuit in which a differential amplifier, formed of emitter-coupled transistors, has its control input operatively connected to the signal sources over a polyemitter transistor, whose emitter diodes are in turn controlled by the input signals over respective emitter follower stages. A relatively very simple yet highly stable circuit may thereby be derived which meets all of the requirements referred to.

BRIEF DESCRIPTION OF THE DRAWINGS

In the drawings, wherein like reference characters indicate like or corresponding parts.

DETAILED DESCRIPTION

Figure 1:
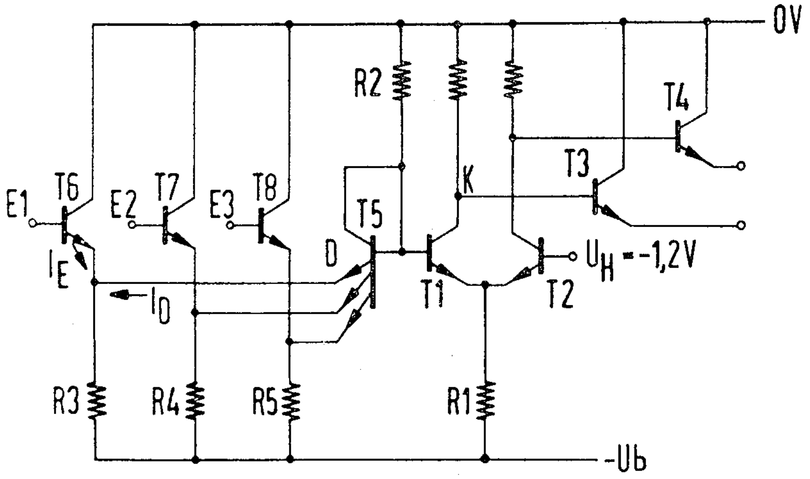
FIG. 1 represents an ECL circuit according to the invention with AND linkage of the input signals.

Referring to the drawings and more particularly to FIG. 1, the gate circuit therein illustrated comprises a differential amplifier, known per se, having transistors T1 and T2 which are coupled with one another over an emitter-biasing resistor R1, which is thus common to both transistors and operatively connected to the negative pole $-Ub$ of an operating voltage source. The base of the transistor T1 forms the control input of the differential amplifier and the base of the transistor T2 is maintained at a constant voltage with respect to the reference potential, by an auxiliary voltage source $U_H$.

The output signals can be derived in both the normal and inverted position at the collectors of the transistors T1 and T2 respectively which are connected to the voltage OV over respective load resistors. In general, however, it will be desirable to provide additional transistors T3 and T4 at the output side of the transistors T1 and T2, functioning as emitter followers, from whose emitters the respective actual outputs may be obtained. The respective output transistors T3 and T4 not only increase the loadability of the gate, but in particular, through their own response threshold, bring about a potential shift of the output signals, of such a magnitude that they are exactly correct for the control of a following ECL circuit. In this connection, it should be appreciated that the signal range, i.e., the difference between the high and low signal potential in the ECL circuit, will normally amount to only about 1 volt.

The logical linkage of the input signals appearing at the terminals E1, E2 and E3 is accomplished by means of a polyemitter transistor T5 and a plurality of transistors T6, T7 and T8, circuited as emitter follower stages. In this circuit, the control input of the differential amplifier (T1, T2) is connected to the collector and base of the polyemitter transistor T5 which in turn are connected over a resistor R2 with the reference potential OV. As illustrated, each of the input terminals E1, E2 and E3 are connected to the base of a respective emitter-follower transistor, the emitter of which is connected in common with an associated emitter of the transistor T5. The respective emitter followers circuited ahead of the respective emitter diodes of the polyemitter transistor T5 serve for any compensation of the voltage drop at the diode paths and in addition, reduce the load of the signal source through a gate input. In this connection, it is expedient to dimension the emitter resistances R3 to R5 in the respective emitter circuits in such a way that the current of the emitter of an emitter-follower and of the emitter diode associated therewith of the polyemitter transistor are equal when a voltage equivalent to the auxiliary voltage $U_H$ lies on the corresponding input.

As a result, there is attained, with the same transistor structure, a substantially complete compensation or balancing of the emitter-base voltages of the polyemitter transistor through the emitter-base voltages of the transistors of the emitter followers. This compensation remains largely preserved even if the voltages change through temperature influences.

As previously mentioned, the usage of ECL circuits is of particular advantage when especially short signal transit times are involved. The so-called gate transit time is determined approximately by the sum of the switching times of the transistors that are present in the signal path. Thus, if one compares the circuit structure of the AND gate according to the invention with that of the known OR gate, it might be thought that there is involved an appreciable increase of the gate transit time. However, the time loss through the logic circuit connected ahead of the differential amplifier is at least partially compensated for by the following differences between the AND gate and the OR gate:

1. The collector of the transistor T1 presents, as compared to the corresponding point of the known OR gate, with otherwise the same layout, a considerably lower substrate capacitance which on the basis of, in each case, three gate inputs, a reduction in the capacitance in the present AND gate by a factor of 3.
2. In the OR gate, the collector capacitance of the unoperated input transistors must be recharged.
3. The emitter followers at the inputs of the AND gate materially reduce the input capacitance.
4. An AND circuit according to the invention can be extended in a simple manner to gates with complex logical linkages.

Figure 2:
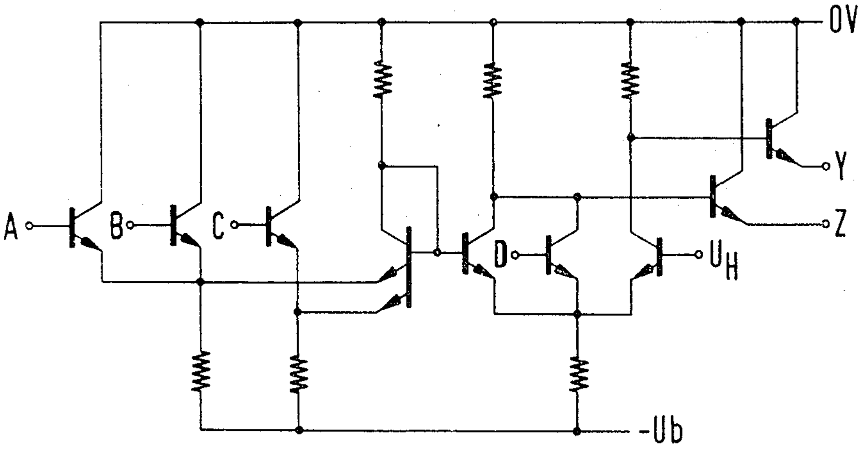
FIG. 2 illustrates an ECL circuit with a complex logical function and which includes an AND linkage.

One of many possible examples thereof is illustrated in FIG. 2. If the signals are designated in correspondence to the respective terminals A to D and Y and Z, respectively, there may then be derived the following logical linkages:

$Y=(A+B).C+D$ and $Z=\overline{(A+B).C+D}$

Figure 3A:
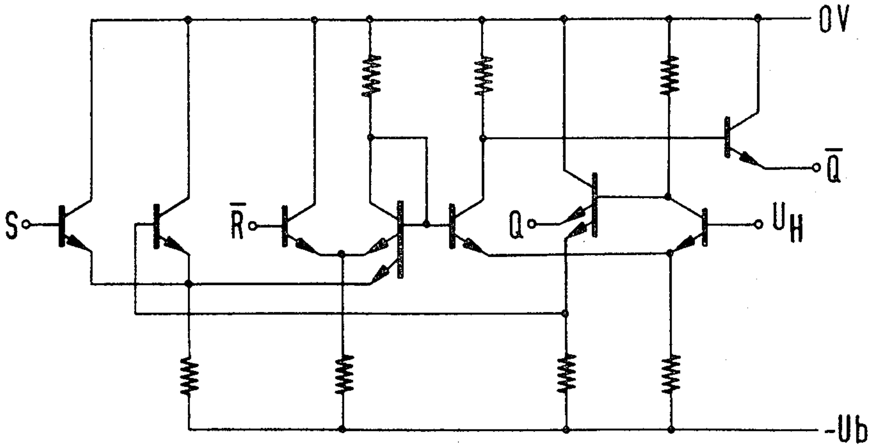
FIG. 3*a* represents an R–S flip-flop circuit utilizing ECL technique in accordance with the invention and comprising an AND gate and an OR gate.
Figure 3B:
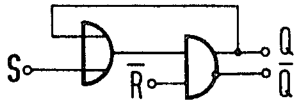
FIG. 3*b* diagrammatically illustrates the broad known combination of an R–S flip-flop.

FIG. 3*a* illustrates a further example of the use of the ECL AND circuit according to the invention to produce an R–S flip-flop in ECL technique, known per se, as illustrated in FIG. 3*b*, as consisting of an OR gate and an AND gate. By means of this circuit arrangement, there is formed the logical function $(S+Q).\bar{R}=Q$. It will be appreciated that in the circuit, if S="0" and $\bar{R}$+"0",the circuit is bistable. For S="O" it then holds that Q="1" (set) and for $\bar{R}$="1" there then holds that Q="O" (reset).

In the examples of the invention illustrated and described, NPN-transistors were illustrated in the fabrication thereof. This arrangement is preferred in monolithic style of construction for reasons of manufacturing technology. With the use of PNP-transistors and pole reversal of the supply voltages, the AND circuit according to FIG. 1, under the assumption of positive logic, now performs the logical function "OR." In this case, it would provide a valuable addition to the arrangement known as an OR circuit, which, with corresponding adaptation of the components, as previously mentioned, would now provide an AND linkage.

Having thus described my invention, it will be obvious that various and material modifications may be made in the same without departing from the spirit of the invention.

I claim as my invention:

1. An emitter-coupled logic circuit for realization of an AND linkage in positive logic, comprising a differential amplifier in the form of emitter-coupled transistors, the base of one of which forms an input circuit therefor and which is to be operatively connected to a plurality of input signal sources, a polyemitter transistor, having its base and collector tied together and connected to said base of said emitter-coupled transistors, and an emitter follower stage for each of said input signal sources, operatively connected thereto, and having its emitter connected to a selected emitter diode of said polyemitter transistor.

2. An emitter-coupled logic circuit according to claim 1, wherein the respective emitter-follower emitter diode paths for said polyemitter transistor are provided with biasing resistors which individually have a value such that in the presence of an input signal equal to a predetermined auxiliary voltage at the differential amplifier, the associated follower emitter current and the current of the corresponding emitter diode of the polyemitter transistor are equal.

3. An emitter-coupled logic circuit according to claim (1 or) 2, wherein each transistor of the differential amplifier has its collector operatively connected to an output over a respective emitter follower stage, one of which provides output signals in a normal position, and the other of which provides output signals in an inverted position.

* * * * *